United States Patent
Mollitor (10) Patent No.: US 8,589,531 B2
(45) Date of Patent: Nov. 19, 2013

(54) NETWORK DIFFERENCE REPORTING

(75) Inventor: Robert Mollitor, Rockville, MD (US)

(73) Assignee: Riverbed Technology, Inc., San Francisco, CA (US)

(*) Notice: Subject to any disclaimer, the term of this patent is extended or adjusted under 35 U.S.C. 154(b) by 1939 days.

(21) Appl. No.: 11/180,888

(22) Filed: Jul. 13, 2005

(65) Prior Publication Data

US 2006/0015604 A1    Jan. 19, 2006

Related U.S. Application Data

(60) Provisional application No. 60/587,968, filed on Jul. 14, 2004.

(51) Int. Cl.
  *G06F 15/173* (2006.01)
(52) U.S. Cl.
  USPC .......................... 709/224; 709/226; 715/229
(58) Field of Classification Search
  USPC ................................................ 709/223–224
  See application file for complete search history.

(56) References Cited

U.S. PATENT DOCUMENTS

| | | | |
|---|---|---|---|
| 5,941,978 A | 8/1999 | Finni | |
| 6,282,175 B1 * | 8/2001 | Steele et al. | 370/254 |
| 7,260,773 B2 * | 8/2007 | Zernik | 715/229 |
| 7,353,510 B2 * | 4/2008 | Noirot-Nerin | 717/175 |
| 2003/0046396 A1 * | 3/2003 | Richter et al. | 709/226 |
| 2003/0237047 A1 | 12/2003 | Borson | |
| 2004/0093347 A1 | 5/2004 | Dada | |
| 2004/0103393 A1 | 5/2004 | Reddy et al. | |
| 2005/0010863 A1 * | 1/2005 | Zernik | 715/511 |
| 2005/0015624 A1 * | 1/2005 | Ginter et al. | 713/201 |
| 2005/0044215 A1 * | 2/2005 | Cohen et al. | 709/224 |

* cited by examiner

*Primary Examiner* — Hua Fan
(74) *Attorney, Agent, or Firm* — Sterne, Kessler, Goldstein & Fox P.L.L.C.

(57) ABSTRACT

A network difference reporting method and system categorizes the differences between two networks, and provides an output report structured by these categories. The preferred categories include objects common to both networks that have different attributes; objects found only in the first network; objects found only in the second network; and objects common to both networks that have similar attributes. A user-interface is provided to allow a user to identify objects or attributes that are to be included or excluded from the identified differences. Preferably, the output reports includes a graphic display of differences that uses the same hierarchical object attribute structure as the networks, to facilitate a rapid understanding of the reported differences between the networks.

32 Claims, 5 Drawing Sheets

```
<network locale="C" version="1.4" attribute_processing="explicit">
  <subnet name="OSPF Network">
    <subnet name="README">                      /— 101
      <attr name="x position" value="69.9"/>
      <attr name="y position" value="71.6"/>    /— 102
      <attr name="outline color" value="#BFBFBF"/>
      <attr name="creation source" value="Object copy"/>
      <attr name="creation timestamp" value="18:43:49 Aug 11 2003"/>
      <annotation name="text_21" type="text">                        /— 103
        <attr name="text [0]" value="This scenario is similar to the previous scenario. In addition, we have"/>
...
    <node name="router2" model="ethernet2_slip8_gtwy" ignore_questions="true" min_match_score="strict matching">
      <attr name="x position" value="-72.2"/>
...
      <attr name="IP Routing Parameters [0].Interface Information [9].Subnet Mask" value="Auto Assigned" symbolic="true"/>
      <attr name="IP Routing Parameters [0].Interface Information [9].Routing Protocol(s)" value="OSPF" symbolic="true"/>
      <attr name="IP Routing Parameters [0].Interface Information [9].MTU" value="Ethernet" symbolic="true"/>
      <attr name="IP Routing Parameters [0].Loopback Interfaces.count" value="1"/>
      <attr name="IP Routing Parameters [0].Loopback Interfaces [0].Name" value="Loopback"/>
      <attr name="IP Routing Parameters [0].Loopback Interfaces [0].Address" value="192.0.8.1"/>
      <attr name="IP Routing Parameters [0].Loopback Interfaces [0].Subnet Mask" value="255.255.255.0"/>
      <attr name="IP Routing Parameters [0].Loopback Interfaces [0].Routing Protocol(s)" value="OSPF" symbolic="true"/>
...
    </node>            /— 110
    <node name="router4" model="ethernet2_slip8_gtwy" ignore_questions="true" min_match_score="strict matching">
      <attr name="x position" value="46.5"/>
...
      <attr name="IP Routing Parameters.count" value="1"/>         /— 111
      <attr name="IP Routing Parameters [0].Router ID" value="192.0.9.1"/>
...
      <attr name="IP Routing Parameters [0].Interface Information [0].Address" value="192.0.2.1"/>
      <attr name="IP Routing Parameters [0].Interface Information [0].Subnet Mask" value="255.255.255.0"/>
      <attr name="IP Routing Parameters [0].Interface Information [0].Routing Protocol(s)" value="OSPF" symbolic="true"/>
...
    </node>
    <node name="router1" model="ethernet2_slip8_gtwy" ignore_questions="true" min_match_score="strict matching">
...
      <attr name="IP Routing Parameters [0].Router ID" value="192.0.10.1"/>
...   </node>
    <node name="router3" model="ethernet2_slip8_gtwy" ignore_questions="true" min_match_score="strict matching">
...
```

FIG. 1 [Prior Art]

```xml
<network-diff a_network="Current Network" b_network="Baseline Network" project="OSPF" tst=" Jun 21 2005">   /* 210 */
<changed-objects>   /* 250 */
  <node full_name="OSPF Network.router1" model="ethernet2_slip8_gtwy" element_type="(Fixed_Node)">
    <attr name="y position" a_value="-9.4" b_value="-7.31"/>
  </node>                            /* 251a   251b */
  <node full_name="OSPF Network.router2" model="ethernet2_slip8_gtwy" element_type="(Fixed_Node)">
    <attr name="OSPF Parameters">       /* 260 */
      <attr name="Processes">
        <subobj index="0">
          <attr name="Process Parameters">
            <attr name="Virtual Links">           /* 261a    261b */
              <subobj index="0">
                <attr name="Neighbor Router ID" a_value="192.0.9.1" b_value="0.0.0.0"/>
                <attr name="Transit Area" a_value="1" b_value="0"/>
              </subobj>
              <attr name="count" a_value="1" b_value="0"/>
            </attr>
          </attr>
        </subobj>
      </attr>
    </attr>
  </node>
  <node full_name="OSPF Network.router4" model="ethernet2_slip8_gtwy" element_type="(Fixed_Node)">
    <attr name="OSPF Parameters">
...
      <attr name="Neighbor Router ID" a_value="192.0.8.1" b_value="0.0.0.0"/>
      <attr name="Transit Area" a_value="1" b_value="0"/>
...
    </attr>      /* 211 */
  </node>
</changed-objects>           /* 220 */
<removed-objects>
</removed-objects>           /* 230 */
<added-objects>
</added-objects>             /* 240 */
<unchanged-objects>
  <subnet full_name="OSPF Network" element_type="(Fixed_Subnet)"/>
  <node full_name="OSPF Network.Ping Config" model="IP Attribute Config" element_type="(Fixed_Node)"/>
  <subnet full_name="OSPF Network.README" element_type="(Fixed_Subnet)"/>
...
  <node full_name="OSPF Network.router3" model="ethernet2_slip8_gtwy" element_type="(Fixed_Node)"/>
  <link full_name="OSPF Network.router3 <-> router4" model="PPP_SONET_OC3" element_type="(Duplex_Link)"/>
  <link full_name="OSPF Network.router4 <-> router5" model="PPP_SONET_OC3" element_type="(Duplex_Link)"/>
  <node full_name="OSPF Network.router5" model="ethernet2_slip8_gtwy" element_type="(Fixed_Node)"/>
...
</unchanged-objects>
</network-diff>
```

FIG. 2

NETWORK DIFFERENCE REPORT

NETWORK OBJECT DIFFERENCES

COMMON OBJECTS WITH DIFFERENCES
    NODES (3)

DELETED OBJECTS

ADDED OBJECTS

OBJECTS WITHOUT DIFFERENCES
    SUBNETS (2)
    NODES (6)
    LINKS (7)
    DEMANDS (3)

— 301

— 310

350 —

COMMON OBJECTS WITH DIFFERENCES

OSPF Network router1 (Fixed Node)

| Attribute | Current Network | Baseline Network |
|---|---|---|
| y position | -9.4 | -7.31 |

351a     351b

360 —

OSPF Network router2 (Fixed Node)

| Attribute | | | | | Current Network | Baseline Network |
|---|---|---|---|---|---|---|
| OSPF Parameters | Processes | 0 | Process Parameters | Virtual Links | count: 1 | 0 |
| | | | | 0 | Neighbor Router ID: 192,0,9,1 | 0.0.0.0 |
| | | | | | Transit Area: 1 | 0 |

361a     361b

OSPF Network router4 (Fixed Node)

| Attribute | | | | | Current Network | Baseline Network |
|---|---|---|---|---|---|---|
| OSPF Parameters | Processes | 0 | Process Parameters | Virtual Links | count: 1 | 0 |
| | | | | 0 | Neighbor Router ID: 192,0,8,1 | 0.0.0.0 |
| | | | | | Transit Area: 1 | 0 |

— 320

DELETED OBJECTS

— 330

ADDED OBJECTS
...

NETWORK DIFFERENCE REPORTING

This application claims the benefit of U.S. Provisional Patent Application No. 60/587,968, filed 14 Jul. 2004.

BACKGROUND AND SUMMARY OF THE INVENTION

This invention relates to the field of network analysis systems, and in particular to a system that facilitates a comparison of networks and provides a variety of reports regarding differences found.

Because of the demands placed upon typical networks, changes are often and continually made; equipment is added or removed, attributes associated with the equipment are adjusted, connections are rerouted, and so on. Ideally, each change is recorded and reported to the network manager, so that if a problem develops on the network, the manager can assess the changes that have been introduced, to identify potential causes. However, this ideal is rarely achieved, and when network problems develop, the typical network manager does not have a complete and/or up-to-date list, and must painstakingly generate one manually.

Also, network managers often use simulation tools to simulate the effect of proposed changes to the network, before the changes are actually made. Even in these cases, however, the complexity of a typical network is such that minor changes may be continually made and unmade throughout the network representation in such a way that it is not easy to build a final list of migration steps or to diagnose problems in the virtual network.

Conventionally, when a network is installed, a 'baseline' network description is created. This represents a stable point for the network. Whenever major changes are introduced, either in the simulated network or in the actual network, a new baseline is made. In some environments, daily or weekly baselines are also kept. When a network problem develops, the network manager compares the latest network description to the appropriate baseline to identify changes since the last known stable point.

A network description typically comprises one or more computer files that can be provided in text-form. An example network description file, in XML format, is illustrated in FIG. 1.

As a first step in a typical diagnostic process, the current and baseline versions of the network description file are compared side-by-side, highlighting any changes. However, the network description file for even a relatively small network may include hundreds of pages. Conventional text-based "file-compare" programs are often used to facilitate such comparing and highlighting of changes. The diagnostician can then review these highlighted 'differences' to identify the potential cause(s) of the problem. The comparison of network descriptions using conventional text-based comparison techniques, however, is often a time-consuming and frustrating process, particularly if the change involves replacing a piece of equipment or modifying connectivity. Even without an equipment or connectivity change, a text-based comparison is cumbersome, because minor parametric changes are highlighted in the same manner as major parametric changes, often obscuring significant changes among a plethora of cosmetic or incidental changes. Additionally, such text-based comparisons do not provide the organization that provides for fast and easy understanding of the differences.

In the example network description of FIG. 1, for example, some of the information in the description, such as the "x" and "y" position attributes 101, and the "color" attribute 102 are provided to facilitate a display of the network on a color graphic display device, and other attributes, such as the "text" attributes 103 are provided to simply annotate the network description. Changes to these attributes 101-103 will not have an effect on the operation of the network, yet a text-based comparison will highlight these changes in the same manner that it highlights changes to attributes that can have an effect on the operation of the network, such as a change to a router's IP address 111.

Similarly, a highlighted change to a router's IP address 111 in a text-based comparison does not immediately convey useful information, because the line in the description that identifies the object ("router4") 110 to which this address 111 applies may be dozens of lines away from this highlighted address 111, and the object 110 will not be highlighted as being changed, because the line that defines the object 110 in the text file of each description will be identical.

In like manner, the need to view the hundreds of pages of the network description with highlighted changes cannot be avoided by having the text-based comparator only display the lines that have changed, because a display of a highlighted change, such as a change to the address 111, is meaningless if presented outside the context of being within the description of the object 110. That is, the diagnostician needs to know that the address change at 111 applies to "router4", which is identified at 110.

It is an object of this invention to provide a network difference system that locates and focuses on the relevant differences between two network descriptions. It is a further object of this invention to provide a method for reporting network differences, in one or more presentation styles, that facilitate rapid understanding of the identified differences.

These objects and others are achieved by a system that locates corresponding pieces of equipment in each network description, ignoring those that are explicitly identified as being "uninteresting", and compares all attributes, except those explicitly identified as uninteresting, hierarchically. A user-interface is provided to allow a user to explicitly identify objects or attributes that are uninteresting for the purposes of the comparison process. Once these correspondences and comparisons are made, the network objects are categorized into one of four groups: objects found in both networks that have differing attributes; objects found in both network that have no differences; objects found only in the baseline network, that is, objects that have been deleted from the network; and objects found only in the current network, that is, objects that have been added to the network. Within the category of objects in both networks that have differences, the individual attribute differences are listed within the original hierarchy of the attributes, so that there is enough context for the user of the report to understand which area has been affected.

BRIEF DESCRIPTION OF THE DRAWINGS

The invention is explained in further detail, and by way of example, with reference to the accompanying drawings wherein:

FIG. 1 illustrates an example description of a network.

FIG. 2 illustrates an example network-difference description in accordance with this invention.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

In accordance with a first aspect of this invention, differences between networks are categorized to facilitate an understanding of the changes made to the network. Of particular interest to a diagnostician or network manager are additions and deletions of objects to the network, as well as changes within existing objects of the network. Each of these categories (added objects, deleted objects, and changed objects) may be of different interest to a user, depending upon the use to which the difference-reporting is being used. Routine network inventory tasks, for example, typically require an identification of added and deleted objects, with little need to identify changed objects, while trouble-shooting tasks more strongly require an identification of changed and deleted objects. For example, when investigating an unexpected pattern of traffic routing, the network manager might first wish to investigate resources that have recently been removed and then those that have recently been reconfigured.

FIG. 2 illustrates an example network difference description in accordance with this aspect of the invention. This example description is provided in XML-format, to facilitate the generation of easy-to-understand reports, discussed below. One of ordinary skill in the art will recognize, however, that other formats may be used to represent the differences found between network descriptions. In like manner, one of ordinary skill in the art will recognize that although this invention is described using the paradigm of comparing two networks, the principles presented herein can be applied for comparing more than two networks.

In FIG. 2, a first category "changed-objects" 210 identifies objects that are common to both networks but that, between the two network descriptions, have differences in one or more attributes of interest. The end of the category 210 is identified by a "/changed-objects" 211 entry, the slash "/" indicating an end to the category. A second category "removed-objects" 220 identifies objects that appear in the baseline network, but not the current network; in this example, no removed-objects were found. A third category "added-objects" 230 identifies objects that appear in the current network, but not the baseline network; in this example, no added-objects were found. A fourth category "unchanged-objects" 240 identifies objects that are common to both networks and that have no differences in any attributes of interest. These four categories have been found to be particularly useful for network management and diagnosis, but one of ordinary skill in the art will recognize that the principles of this invention are not limited to the use of these particular categories.

As discussed further below, in accordance with another aspect of this invention, a user may identify which attributes are to be included or excluded from the reported "differences", and the term "difference" as used herein is defined in terms of these inclusions and exclusions unless otherwise noted. That is, two objects that have differences only in attributes that the user has excluded from comparison are considered herein not to have differences, and thus are substantially identical. In like manner, a user may identify a threshold value for the comparison of some attributes, and a "difference" occurs only when the attributes differ by at least the threshold amount.

In accordance with another aspect, the difference description includes an identification of the actual difference, as well as an identification of the object to which the difference applies. At 251a, for example, the difference description identifies that the "a_value" of a "y position" attribute is "−9.4", whereas, at 251b, the "b_value" of this attribute is "−7.31" (in this format, the "a_value" corresponds to the value of the attribute in the current network description, and the "b_value" corresponds to the value of the attribute in the baseline network description). This information is virtually meaningless without reference to the object to which this "y position" attribute applies; thus, the difference description also includes an identification of the object "OSPF Network.router1", at 250. That is, although both network descriptions contain the same identification of the object 250, this information is included in the difference description, to place the actual difference 251a-b in proper context.

Similarly, in accordance with another aspect, the difference description also retains the hierarchical attribute structure for the network objects to further facilitate an understanding of the reported difference. In FIG. 2, items 261a, 261b identify a detected difference in a "Neighbor Router ID", wherein the current network includes an address "192.0.8.1", whereas the baseline network includes a different entry, "0.0.0.0" (presumably, a default value that serves to signal an undetermined IP address). As above, the difference description includes an identification of the object "OSPF Network.router2" 260 to which this "Neighbor Router ID" attribute applies, to place the attribute in proper context. However, in accordance with this aspect, the difference description also includes the "tree-structure" that defines the location of the attribute within the data structure used within the network description. That is, in this example, the "Neighbor Router ID" attribute belongs to a subobject (with index of "0") of the attribute "Virtual Links", which is within the set of attributes named "Process Parameters", which belongs to a subobject (also with index of "0") of the attribute "Processes", which is within the set of attributes named "OSPF Parameters", all of which belong to the network object named "OSPF Network.router2" 260. As will be detailed further below, the inclusion of the hierarchical structure corresponding to the detected difference is particularly advantageous for presenting a graphical representation of the network differences, using the same object attribute hierarchy as used in the description of the network.

Of particular note, the difference description within the "changed-objects" 210 category preferably only includes the attributes that are found to differ, and the information needed to place the changed attribute in proper context within the network description. In this manner, the changed attributes are not obscured by the myriad of unchanged attributes within the network object, and yet contain the information needed to facilitate network management and/or diagnosis.

The "unchanged objects" 240 category preferably only includes an identification of the network objects, without details regarding their (unchanged) attributes. In a typical embodiment, by providing each object's "full_name", full attribute details can be accessed from either the baseline or the current network descriptions, if required, using conventional database access techniques. In like manner, the "removed objects" 220 category preferably only includes an identification of each network object by its full name. In this case, full attribute details can be accessed from the baseline network description, if required. The "added objects" 230 category may also include only an identification of each network object by its full name. However, in a preferred embodiment, it can optionally include the attribute differences between the object in the current network description and a default configuration of the same type of network object. This extra information, like the difference information for "changed objects" 210, would only list attributes that differ from the default configuration, along with sufficient attribute hierarchy to place the attribute in context.

Figure 3:
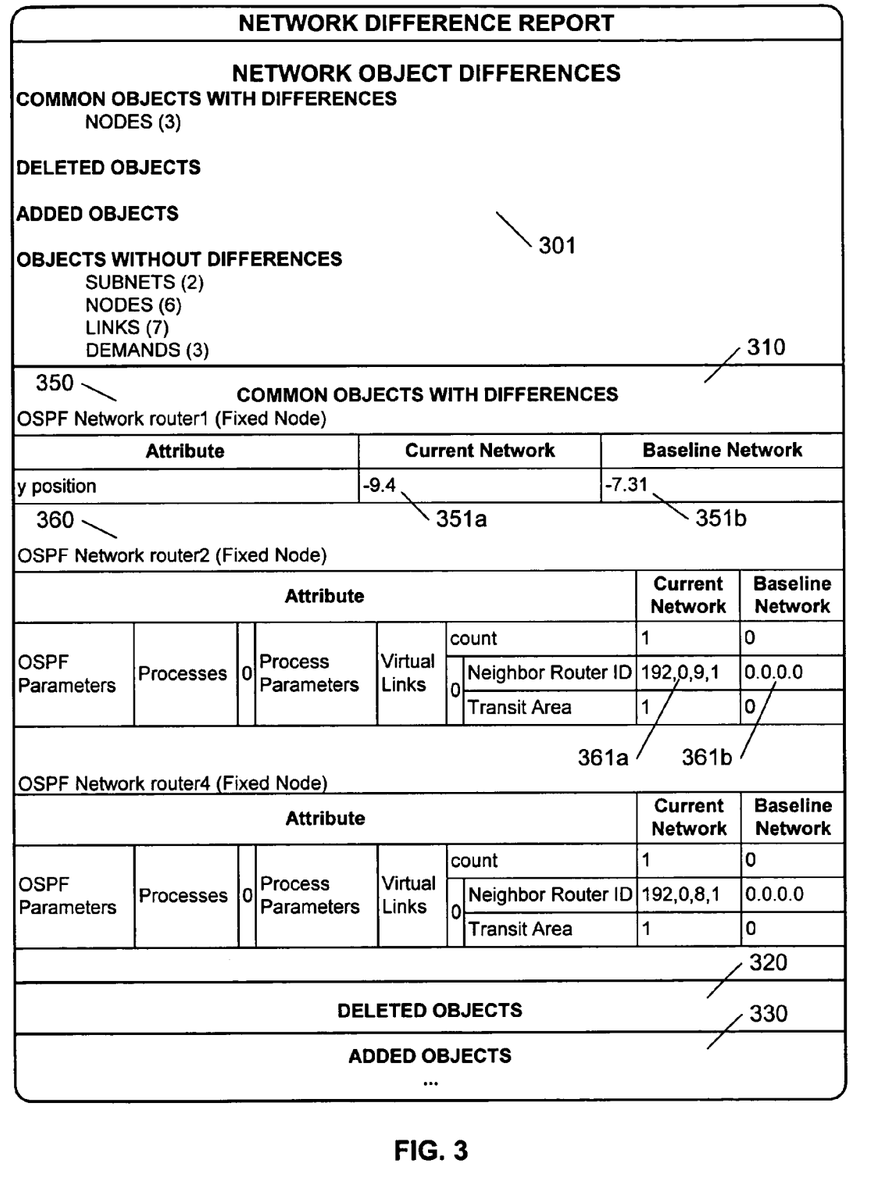
FIG. 3 illustrates an example network-difference report in accordance with this invention.

FIG. 3 illustrates an example format of a "Network Difference Report" corresponding to the example difference description of FIG. 2. The example report is partitioned into sections 301, 310, 320, etc. Section 301 presents a summary of the detected differences. In this example, three "nodes" are reported as being common objects with different attributes; no objects are reported as being deleted or added; and two "subnets", six "nodes", seven "links", and three "demands" are reported as being identical in the two networks.

Section 310 contains details regarding the objects with differences, corresponding to the objects in category 210 in FIG. 2. In this example, "OSPF Network.router1" object 350 is reported as an object having different attributes, corresponding to object 250 in FIG. 2, and the different values 351a, 351b of the "y position" attribute of the "Current Network" and the "Baseline Network" are reported, corresponding to the entries 251a, 251b in FIG. 2.

In like manner, the different attribute values 361a, 361b of the "OSPF Network.router2" object 360, corresponding to entries 261a, 261b of FIG. 2, are reported. Of particular note, in accordance with another aspect of this invention, even though the format of FIG. 3 is tabular, the report is organized to allow for a representation of the hierarchy associated with each changed attribute. For example, the identification of the hierarchical position of the "Neighbor Router ID" attribute having these attributes 361a, 361b is illustrated by the columns ("OSPF Parameters", "Processes", etc.) under the column labeled "Attribute", corresponding to the entries between object 260 and attributes 261a, 261b in the differences description of FIG. 2. In a preferred embodiment, a column is added to the report output for each attribute object and sub-object along the hierarchical path within the network object to the changed attribute. Optionally, a column is also added to allow the display of each index within this hierarchy to the attribute. Conventional horizontal scrolling, with optional "locked" columns, is provided when the number of sub-columns exceeds a given limit.

The other categories (deleted objects, added objects, unchanged objects) of the differences description will similarly be displayed in the network difference report of FIG. 3. However, as contrast to the detailed display of the attribute values of section 310, these other sections will merely contain the name of each deleted, added, or unchanged object. If the optional comparison against default values information was performed for added objects, then that information will be presented like the attribute tables for the changed objects, except that the title of the final column will be "default value" instead of "Baseline Network".

Figure 4:
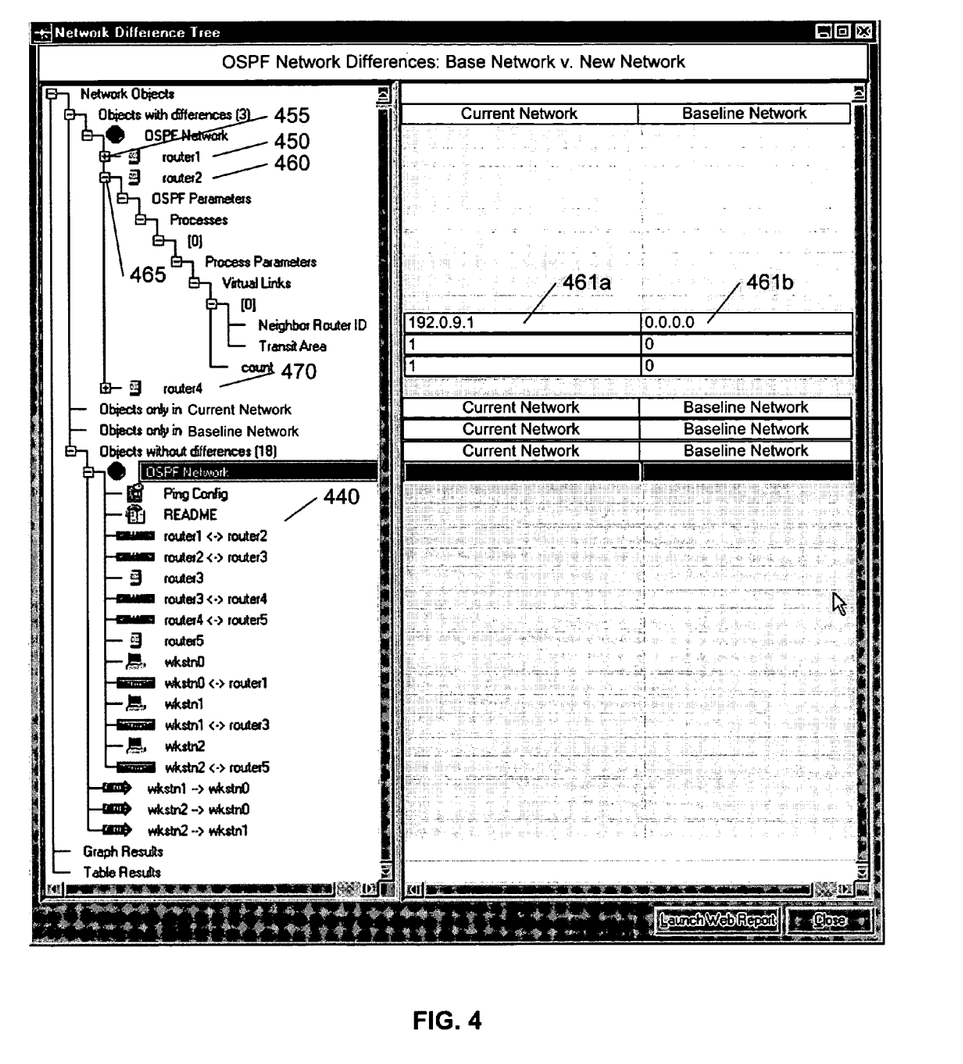
FIG. 4 illustrates an example hierarchical network-difference report in accordance with this invention.

FIG. 4 illustrates an alternative format for reporting the network differences, based on the differences description of FIG. 2. The left side of FIG. 4 illustrates a graphic representation of the hierarchical structure of the differences description, based on the hierarchical object attribute structure of the network description. In this example, the "Objects with differences" section is presented in detail, with entries at each hierarchical level being selectively presented in an "exploded" or "unexploded" form. For example, the "OSPF Network" has three objects with differences, "router1" 450, "router2" 460, and "router4" 470.

The "router2" 460 object is illustrated in exploded form, using a conventional hierarchical representation of a "−" box 465 to indicate an exploded view. Each of the sub-levels of the hierarchy ("OSPF Parameters", "Processes", etc.) are illustrated, down to the attributes ("Neighbor Router ID", "Transit Area", and "count") that differ between the "router2" object in the "Baseline Network" and the "Current Network". On the right side of FIG. 4, the differing values of the attributes in each of the "Baseline Network" and the "Current Network" are illustrated, including the values 461a, 461b that correspond to the values 261a, 261b in the difference description of FIG. 2, and 361a, 361b in the tabular report of FIG. 3.

The "router1" 450 and "router4" 470 objects are presented in "unexploded" form. Using the conventional hierarchical representation, a "+" box 455 indicates that object 450 has more detailed information available. Clicking on the "+" box causes the exploded form to be presented, with the "+" box being replaced by a "−" box, to indicate an exploded view. In the exploded form of "router1" 450, the attribute having a different value in each network (251a, 251b of FIG. 2) will be illustrated.

Section 440 of FIG. 4 illustrates a display of the "Objects without differences" within the two networks, corresponding to category 240 of FIG. 2. As in FIG. 2, only the names of the objects are displayed. However, one of ordinary skill in the art will recognize that the displayed items can be linked to their full description in the network description files, so that, for example, double-clicking on any of the displayed names can result in the full details of the object to be displayed, either within FIG. 4, or by opening a new window using a conventional network-viewing application.

Figure 5:
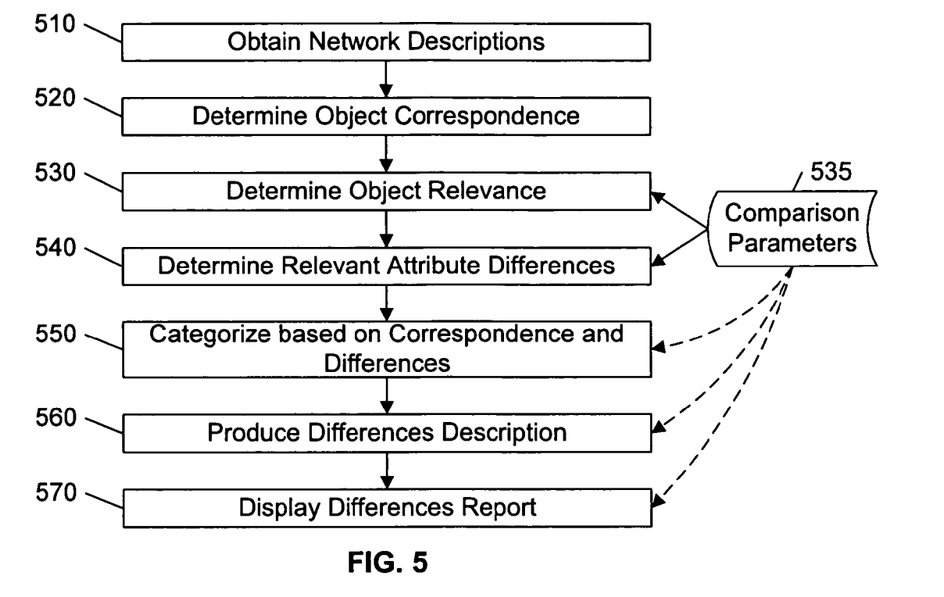
FIG. 5 illustrates an example flow diagram of a network-difference reporting system in accordance with this invention.

FIG. 5 illustrates an example flow diagram of a network-difference reporting system. At 510, the descriptions of the networks to be compared are obtained. As noted above, although the examples of this disclosure illustrate the comparison of two networks, any number of networks may be compared.

At 520, the system enumerates over the objects in the networks and creates a correspondence between pairs of objects. In the typical case, the correspondence is accomplished simply by matching the full names of the respective network objects of the same type. However, in principle the correspondence can be accomplished by using any attribute or algorithm that generates unique object identifiers. The system keeps track of those objects which correspond to each other in the different networks and of those objects for which no corresponding object is found.

At 530, the system determines which network objects are of interest, based on a set of comparison behavior parameters 535. As contrast to a conventional text-based comparison of the network descriptions, these parameters 535 preferably allow a user to selectively exclude whole pieces of the network from the difference operation. In a preferred embodiment, the parameters specify which types of network objects, such as subnets, nodes, links, paths, and demands, to include in the report. Additionally, objects included in the network description for 'administrative' purposes, such as notes, comments, and annotations may be selectively included or excluded from the comparison. In a preferred embodiment, the user may also include or exclude objects that have a particular value of an attribute, such as "creation source", or of a property, such as whether the object is marked as hidden.

At 540, the differences between the corresponding objects of the different networks are identified, based also on the set of comparison behavior parameters 535. Specific named attributes, as well as "classes" of attributes, such as attributes that affect the operation or modeling of the network, attributes that affect the visual display of the network, attributes associated with particular network objects, such as transmitter and receiver attributes, and so on, may be identified by the behavior parameters 535 as being irrelevant for purposes of creating the difference data. When an attribute is identified as not relevant, difference data is not generated for that attribute, and its corresponding values are not considered when determining whether the object has differences. That is, if the objects differ only in the values of excluded attributes, then the object is identified as having no differences in the difference report.

At 550, the various network objects are categorized, based on whether they are found in only one or both networks and, for those found in both networks, whether they have any differences in the various relevant attributes. The four main categories, as mentioned above, are preferably "added objects", which are those found only in the current network; "deleted objects", which are those found only in the baseline network; "changed objects", which are those found in both networks that have relevant differences; and "unchanged objects", which are those found in both network that have no relevant differences.

At 560, the differences description is produced, and at 570, the differences report is generated. Note that the explicit creation of a differences description is optional, and the functions performed at blocks 560 and 570 could be performed in a single report generation block. The production of a differences description allows for the use of different report generators, depending upon the user's requirements, and also allows for the development of third-party report generators for particular applications. Preferably, the differences description includes a data structure that captures the categorization of the differences, and also captures the hierarchical description of the attributes corresponding to the original network descriptions, as illustrated in the example differences description of FIG. 2. The differences are displayed, via 570, preferably in tabular and graphic form, as illustrated in FIGS. 3 and 4, respectively.

Figure 6:
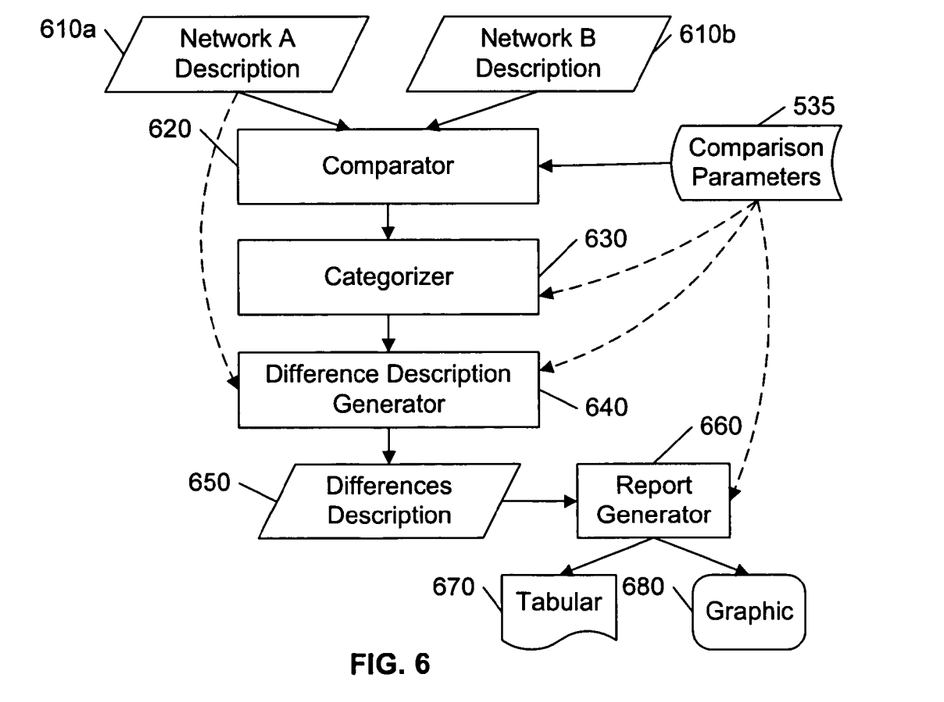
FIG. 6 illustrates an example block diagram of a network-difference reporting system in accordance with this invention.

FIG. 6 illustrates an example block diagram of a network-difference reporting system. A comparator 620 compares two or more network descriptions 610*a*, 610*b*, based on comparison behavior parameters 535, discussed above. A categorizer 630 partitions the identified differences into different categories, which may be pre-defined default categories, or categories defined in the parameters 535.

A difference description generator 640 preferably creates a differences description file, or database, 650, which is processed by one or more report generators 660 to provide a network difference report, preferably in either tabular 670 or graphic 680 form.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the generated difference report(s) are described herein in a very basic form. One of ordinary skill in the art will recognize that the reports can be enhanced using a variety of conventional techniques, such as the use of color-coding to draw the user's attention to particular differences, as well as the use of different graphic structures to highlight differences. For example, in addition to the example reports of FIGS. 3 and 4, the user could be provided with a conventional graphic view of the network, with changed objects identified by a bright color, deleted objects in a grayed-out format, added objects presented in bold format, and so on. In such an embodiment, "clicking" on the changed objects may then provide a more detailed view, such as illustrated in FIGS. 3 and 4. These and other system configuration and optimization features will be evident to one of ordinary skill in the art in view of this disclosure, and are included within the scope of the following claims.

In interpreting these claims, it should be understood that:
 a) the word "comprising" does not exclude the presence of other elements or acts than those listed in a given claim;
 b) the word "a" or "an" preceding an element does not exclude the presence of a plurality of such elements;
 c) any reference signs in the claims do not limit their scope;
 d) several "means" may be represented by the same item or hardware or software implemented structure or function;
 e) each of the disclosed elements may be comprised of hardware portions (e.g., including discrete and integrated electronic circuitry), software portions (e.g., computer programming), and any combination thereof;
 f) hardware portions may be comprised of one or both of analog and digital portions;
 g) any of the disclosed devices or portions thereof may be combined together or separated into further portions unless specifically stated otherwise;
 h) no specific sequence of acts is intended to be required unless specifically indicated; and
 i) the term "plurality of" an element includes two or more of the claimed element, and does not imply any particular range of number of elements; that is, a plurality of elements can be as few as two elements.

I claim:

1. A method of diagnosing a network by a network analysis system implemented on a computer system, said method comprising:
 obtaining, by the network analysis system, a first network description file comprising network objects that indicate a baseline state of equipment in the network,
 obtaining, by the network analysis system, a second network description file comprising network objects that indicate a current state of equipment in the network,
 obtaining, by the network analysis system responsive to a user input, a set of comparison behavior parameters indicating equipment in the network that are of interest by the user,
 comparing, by the network analysis system, respective objects in the first network description file and the second network description file corresponding to the same equipment in the network, based on the comparison behavior parameters,
 categorizing, by the network analysis system, the comparison between objects in the first network description file and the second network description file based on objects that are unchanged, changed, deleted, and added, and
 providing, by the network analysis system, information for displaying a difference report comprising a set of categories to indicate objects that are unchanged, changed, deleted, and added in the network.

2. The method of claim 1, wherein at least one category of the set of categories includes a network object that is common to the first and second network description files, and includes one or more attributes that differ in the first and second network description file.

3. The method of claim 2, wherein the difference report includes an identification of the network object and each of the one or more attributes that differ.

4. The method of claim 3, wherein the first and second network description files identify a hierarchical network object attribute structure, and the difference report is further structured based on the hierarchical network object attribute structure.

5. The method of claim 4, wherein the difference report includes an identification of each hierarchical layer of the hierarchical network object attribute structure corresponding to each of the one or more attributes that differ.

6. The method of claim 5, further including displaying the identification of each hierarchical attribute layer selectively in one of: a tabular form, and a graphic form.

7. The method of claim 6, wherein the tabular form includes a column corresponding to each hierarchical attribute layer, which is configured to contain the identification of the hierarchical attribute layer.

8. The method of claim 2, wherein at least one other category of the set of categories includes network objects that are included in the first network description file, and not included in the second network description file.

9. The method of claim 8, wherein at least one other category of the set of categories includes network objects that are equivalent in each of the first and second network description files.

10. The method of claim 1, wherein at least one category of the set of categories includes network objects that are included in the first network description file, and not included in the second network description file.

11. The method of claim 10, wherein the difference report includes an identification of the network object and each of one or more attributes that differ from default attributes associated with the network object.

12. The method of claim 11, wherein the first network description file identifies a hierarchical network object attribute structure, and the difference report is further structured based on the hierarchical network object attribute structure.

13. The method of claim 12, wherein the difference report includes an identification of each hierarchical layer of the hierarchical network object attribute structure corresponding to each of the one or more attributes that differ from the default attributes.

14. The method of claim 1, wherein the comparison behavior parameters include an identification of network objects that are to be excluded from the comparison.

15. The method of claim 14, wherein the comparison behavior parameters include an identification of attributes that are to be excluded from the comparison.

16. The method of claim 1, wherein the comparison behavior parameters include an identification of attributes that are to be excluded from the comparison.

17. A network difference reporting system configured to diagnose a network based on analyzing network description files that indicate different states of the network, said system comprising:

a comparator that is configured to compare a first network description file comprising objects identifying equipment in a network at a baseline state and a second network description file comprising objects identifying equipment in the network at a current state; and a report generator that is configured to display a comparison of the first network description file and the second network description file in a set of categories that indicates objects that are unchanged, changed, added, or deleted, wherein:

the first and second network description files identify a hierarchical network object based on an attribute structure, the report generator is configured to display the comparison between objects in the first network description file and the second network description file based on the hierarchical network object attribute structure, and a categorizer that is configured to categorize the comparison between objects in the first network description file and the second network description file into a set of categories to indicate objects that are unchanged, changed, added, or deleted.

18. The system of claim 17, wherein at least one category of the set of categories includes network objects that are common to both the first and second network description files and include one or more relevant attributes that differ between the first and second network description files.

19. The system of claim 18, wherein at least another category of the set of categories includes network objects that are included in the first network description file and are not included in the second network description file.

20. The system of claim 19, wherein at least another of the categories includes network objects that are not included in the first network description file and are included in the second network description file.

21. The system of claim 20, wherein at least another of the categories includes network objects that are common to both the first and second network description file and do not have any relevant attributes that differ between the first and second network description files.

22. The system of claim 17, wherein the comparator is configured to compare the first and second network description files based on a user-defined set of comparison parameters.

23. The system of claim 22, wherein the user-defined set of comparison parameters are configured to distinguish included network objects from excluded network objects, and the comparator is further configured to determine the differences based on the included network objects only.

24. The system of claim 23, wherein the user-defined set of comparison parameters are configured to distinguish included attributes from excluded attributes, and the comparator is further configured to determine the differences based on the included attributes only.

25. The system of claim 24, wherein the user-defined set of comparison parameters are configured to distinguish included attributes from excluded attributes, and the comparator is further configured to determine the differences based on the included attributes only.

26. The system of claim 17, further including a difference description generator that is configured to receive the differences and to produce therefrom a differences description, and the report generator is configured to display the differences based on the differences description.

27. The system of claim 26, wherein the differences description is XML-encoded.

28. The system of claim 17, wherein the report generator is configured to selectively display the differences in one of: a tabular form, and a graphic form.

29. The system of claim 28, wherein the report generator is configured to include an identification of each hierarchy of the hierarchical network object attribute structure.

30. The system of claim 29, wherein the identification of each hierarchy is included in a corresponding column of a table when the differences are displayed in the tabular form.

31. The system of claim 17, wherein the report generator is configured to color-code the differences for display.

32. The system of claim 17, wherein the first and second network description files are XML-encoded.

* * * * *